(12) United States Patent
Sun et al.

(10) Patent No.: US 12,121,997 B1
(45) Date of Patent: Oct. 22, 2024

(54) PNEUMATIC CHIP HUGE TRANSFER MECHANISM FOR A LASER UNGLUING NEEDLE

(71) Applicant: BEIJING HAIJU ELECTRONIC TECHNOLOGY CO., LTD., Beijing (CN)

(72) Inventors: Haiwei Sun, Beijing (CN); Jingchao Fan, Beijing (CN); Jie Xu, Beijing (CN); Deshu Niu, Beijing (CN); Caizheng Zhang, Beijing (CN)

(73) Assignee: BEIJING HAIJU ELECTRONIC TECHNOLOGY CO., LTD. (CN)

( * ) Notice: Subject to any disclaimer, the term of this patent is extended or adjusted under 35 U.S.C. 154(b) by 0 days.

(21) Appl. No.: 18/597,988

(22) Filed: Mar. 7, 2024

(30) Foreign Application Priority Data

Sep. 19, 2023 (CN) .......................... 202311212308.8

(51) Int. Cl.
| | |
|---|---|
| *B23K 26/40* | (2014.01) |
| *B23K 26/12* | (2014.01) |
| *B23K 26/402* | (2014.01) |
| *B23K 37/02* | (2006.01) |
| *B23K 37/04* | (2006.01) |
| *B23K 101/40* | (2006.01) |
| *B23K 103/00* | (2006.01) |

(52) U.S. Cl.
CPC ............ *B23K 26/402* (2013.01); *B23K 26/12* (2013.01); *B23K 37/0211* (2013.01); *B23K 37/0247* (2013.01); *B23K 37/0408* (2013.01); *B23K 2101/40* (2018.08); *B23K 2103/42* (2018.08)

(58) Field of Classification Search
None
See application file for complete search history.

(56) References Cited

FOREIGN PATENT DOCUMENTS

| CN | 113399822 A | * | 9/2021 |
| CN | 115050858 A | * | 9/2022 |
| CN | 115084323 A | * | 9/2022 |
| WO | 2023000632 A1 | | 1/2023 |

OTHER PUBLICATIONS

Machine translation of CN-115084323-A, Jun. 2024 (Year: 2024).*
Machine translation of CN-113399822-A, Jun. 2024 (Year: 2024).*
Machine translation of CN115050858A, Jun. 2024 (Year: 2024).*

* cited by examiner

*Primary Examiner* — Geoffrey S Evans

(57) ABSTRACT

This invention introduces a pneumatic chip transfer mechanism for laser ungluing needles in the semiconductor optoelectronic field. It comprises upper and lower platform mobile systems, and a central transfer platform system equipped with a transfer slide, vertical power module, needle clamping bracket, and a laser-assisted needle assembly. This assembly includes a laser section with a window, a pneumatic section with an inlet hole, and a micro-hole needle aimed at the blue film assembly on the lower platform. A camera assembly, laser bracket, and laser generator are also integral parts. The mechanism employs a laser generator to modify blue film material properties, creating a bubble that facilitates chip detachment onto a target substrate. This design ensures efficient, flexible Mini/Micro LED chip transfers, revolutionizing chip detachment methods with its innovative approach to leveraging laser and pneumatic technologies for optimal performance.

10 Claims, 10 Drawing Sheets

PNEUMATIC CHIP HUGE TRANSFER MECHANISM FOR A LASER UNGLUING NEEDLE

TECHNICAL FIELD

The present invention relates to the field of semiconductor optoelectronic technology, in particular to a pneumatic chip huge transfer mechanism for a laser ungluing needle.

BACKGROUND ART

In recent years, Mini/Micro LED display technology has emerged. The Mini/Micro LED display screen consists of a large number of micron-sized LED display chips, which are packaged independently to form a single pixel, and it has incomparable advantages in luminous efficiency, power consumption, contrast, response speed and life. It is the best choice for the next generation of mainstream displays and has become the ultimate display technology in the 21st century.

Mini/Micro LED display production process from the upstream: wafer deposition, mask exposure, etching, PCB design, gold wire flying and other processes, to the middle stream: solder paste printing, mass transfer (MT, Mass Transfer), laser welding, gluing packaging and other processes, then to the downstream: inter-board screen adjustment, full-page splicing, packaging TV and other processes, all of which affect production efficiency and production cost. Wherein, the huge transfer is to transfer millions or even tens of millions of micro-LED chips from the source substrate to the target substrate accurately and efficiently. Even if 10,000 chips are transferred at a time, it needs to be repeated at least hundreds of times. The number of transfer chips is huge and the accuracy requirements are extremely high. Huge transfer has become a key link to limit production capacity in Mini/Micro LED packaging process. Huge transfer technology directly affects the production speed, yield and production cost of Mini/Micro LED display, which is the key factor restricting the mass production of LED display. At present, there are many kinds of transfer methods in the world, and the transfer methods used in the industry are mainly divided into two types: mechanical swing arm type and needle type, wherein the mechanical swing arm type is limited by its own structure, and the production capacity is limited and cannot be greatly improved; the needle type transfer optimizes the transfer stroke and transfer structure, and uses needle to chip drive transfer. It has low requirements on film materials and does not require complex actions. It is the best alternative to mechanical swing arm type and the only promising transfer method currently used in production.

In the existing technology, A CHIP TRANSFER METHOD, SYSTEM AND EQUIPMENT described in the patent application 202110109928.3 adopts the method of pushing the needle through the blue film on the component ring, and stripping the chip from the blue film and transferring it to the substrate of the mounting platform directly below. Due to the limitation of the transfer mode, the pushing needle must be pierced to the light-emitting side of the chip to realize the bonding between the chip electrode and the pad on the substrate.

The light-emitting side of the chip is more fragile than the electrode side. Transferring the light-emitting side of the rigid needle is bound to cause a large number of chips to be damaged, affecting the transfer efficiency and transfer yield.

A HUGE TRANSFER MECHANISM OF MICROLED described in the patent application 202110574750. X, wherein, a small range of chips are tensioned on the transfer film by a top suction assembly, and the thorn arm with a leaf spring bearing or a spring driven by a voice coil motor is transferred to the chip. The control of its top suction assembly is complex, and in the process of part selection, some chips will inevitably be rubbed and lost.

Although the piercing arm uses an elastic device to eliminate some rigid contacts, the final effect on the light-emitting side of the chip is still rigid contact. Under the condition of Micro LED chip transfer without sapphire backing layer, more chips will be damaged and affect the transfer.

A HUGE TRANSFER METHOD AND EQUIPMENT described in patent application 202210524975.9 are transferred by acupuncture. It is transferred by acupuncture, and the target chip is transferred on the transfer film by acupuncture. The chip on the transfer film is aligned with the pad and then pressed and welded, and finally, the test and repair are performed. Although this scheme can pierce the electrode side with higher relative strength, its rigid needle will rub the electrode. The service life of the product is affected, and the increase of the influencing factors in the two-step transfer process will affect the transfer efficiency and transfer yield.

A TRACKING STABLE DISTANCE PNEUMATIC HUGE TRANSFER DEVICE is described in patent application 202310161990.6. Wherein it uses the tracking and stable distance technology to ensure that the distance between the working position of the pneumatic actuator and the source substrate is always constant, eliminates the influence of the fluctuation of the distance between the pneumatic actuator and the source substrate on the working gas, and realizes the consistency of the gas state acting on the crystal film when transferring the chip of the pneumatic giant transfer device. However, the film tension is not enough, and the formation of bubbles rebound slowly, affecting the transfer efficiency.

A PNEUMATIC NEEDLE-PUNCHING HUGE TRANSFER DEVICE is described in patent application 2023104732760. Wherein it peels the chip from the crystal film to the target solder joint by needle punching and pneumatic method, the needle-punched blue film increases the tension of the film, reduces the rebound time of the film, and improves the transfer efficiency. Because the needle and the film form a small closed space, the gas pressure at the needle is increased, and the bubbles with better posture are formed. However, the viscosity of its film material is difficult to control, which will cause some chips to be unable to be bonded by solder paste, affecting the transfer efficiency.

SUMMARY

The purpose of the present invention is to provide a pneumatic chip huge transfer mechanism for a laser ungluing needle. Wherein it uses a laser generator to greatly change the performance of a small range of blue film materials, blowing to produce a well-formed bubble, driving the chip to peel off to the target substrate, and it can realize the huge transfer of Mini/Micro LED chips with high efficiency, high yield, no damage to the chip, controllable transfer attitude, high jet utilization, good bubble shape and flexible contact.

In order to achieve the above purpose, the present invention provides a pneumatic chip huge transfer mechanism for a laser ungluing needle. Wherein it includes an upper platform mobile system, a transfer platform system, a lower platform mobile system. The transfer platform system is set on the mobile system of the upper platform, and the transfer platform system includes a transfer slide, a vertical power module, a needle clamping bracket, a laser-assisted needle assembly, a camera assembly, a laser bracket and a laser generator, the vertical power module and the camera assembly are fixed side by side on the transfer slide. The needle clamping bracket is set on the front surface of the vertical power module. The laser bracket is arranged on the top of the vertical power module, and the laser generator is fixed on the laser bracket. The laser generator faces the laser-assisted needle assembly, and the laser-assisted needle assembly is a hollow cylindrical shape. The laser-assisted needle assembly includes a laser section, a pneumatic section and a micro-hole needle, the laser section and the pneumatic section are separated by a laser focusing objective lens. The side top of the laser section opens to form a laser window, and the laser window is equipped with a window flat lens. A window reflector is set in the laser window, and the window reflector is placed at 45°. After the laser emitted by the laser generator passes through the window flat lens, it is reflected by the window reflector and passes through the laser focusing objective lens, the pneumatic section and the micro-hole needle in turn. A circular inlet hole is set on the side of the pneumatic section, and the tip of the microporous needle moves towards the lower platform moving system. The top of the lower platform moving system is provided with a fixed blue film assembly and a three-degree-of-freedom moving substrate fixture.

Preferably, the upper platform moving system comprises a marble base, a left marble column, a right marble column, an upper Y-axis left motor, an upper Y-axis right motor and a beam. The left marble column and the right marble column are symmetrically arranged on both sides of the upper surface of the marble base, and the stator of the left Y-axis motor is arranged on the upper surface of the left marble column. The stator of the motor of the shaft is arranged on the correct marble pillar on the upper surface, the left and right end of the beam are fixed with the upper shaft pusher away from the car and the upper shaft pusher is fixed with the upper shaft motor arranged on the front end of the middle beam, the upper shaft motor on the upper shaft guide rail and the lower shaft guide rail on the upper shaft are arranged on the upper shaft motor, and the upper X-axis guide rail and the lower X-axis guide rail are fixed on the front surface of the beam.

Preferably, the transfer slide includes a transfer slide transition plate and a transfer slide A slider, a transfer slide B slider, a transfer slide C slider, a transfer slide D slider, the transfer slide A slider, the transfer slide B slider, the transfer slide C slider and the transfer slide D slider are divided into two rows on the back of the transfer slide transition plate. Wherein the transfer slide A slider and the transfer slide C slider are slidingly connected to an upper X-axis upper guide rail, the transfer slide B slider and the transfer slide D slider are slidingly connected to an upper X axis lower guide rail. A mover of the upper X-axis motor is fixedly connected to the back of the transfer slide transition plate, and the vertical power module includes a vertical power module stator and a vertical power module mover. A stator of the vertical power module is fixedly connected to a left front surface of the transfer slide transition plate. A mover of the vertical power module is sliding connected with the stator of the vertical power module, and the needle clamping bracket is fixed on the mover of the vertical power module.

Preferably, the blue film assembly includes a blue film scaffold and a blue film, and the two ends of the blue film scaffold are fixedly connected with the inner side of the left marble pillar and the inner side of the right marble pillar respectively. The material of the blue film scaffold is one of stainless steel, aluminum and alloy materials. The surface flatness is within 15 microns, and the surface is anodized;

The blue film is arranged in the groove in the middle of the blue film scaffold. The back array of the blue film is bonded with several Mini/Micro LEDs and chips. The blue film is based on PET film substrate, and the surface of the blue film is coated with UV coating. The lower platform moving system also includes vacuum base, vertical track of substrate, cylinder group, lower X-axis motor, lower X-axis slide plate, lower X-axis front track, lower Y-axis rear track, lower Y-axis slide plate, lower Y-axis motor, lower Y-axis left track and lower Y-axis right track.

Preferably, the lower platform mobile system also includes a vacuum base, a vertical track of substrate, a cylinder group, a lower X-axis motor, a lower X-axis slide plate, a lower X-axis front track, a lower Y-axis rear track, a lower Y-axis slide plate, a lower Y-axis motor, a lower Y-axis left track and a lower Y-axis right track. Wherein the substrate fixture is fixed on the vacuum base. The middle of the front and back ends of the vacuum base are respectively sliding connected with the vertical orbits of the two substrates. The two vertical rails of the substrate are fixed in the middle of the front and rear ends of the lower X slide plate respectively.

The cylinder group consists of four cylinders, which are respectively arranged on the upper surface of the lower X slide plate, and the piston rod of the four cylinders is connected with the bottom four corners of the vacuum base; The bottom surface of the lower X slide plate is connected with four sliders. The four sliders are divided into two rows and sliding connected with the front track of the lower X axis and the rear track of the lower X axis respectively, the front track of the lower X-axis and the rear track of the lower X-axis are fixed at the front and rear ends of the upper surface of the lower Y sliding table, respectively. The lower X-axis motor is located between the front track of the lower X-axis and the rear track of the lower X-axis and is fixedly connected with the lower Y-axis slide plate.

The bottom surface of the lower X slide plate is connected with four sliders. The four sliders are divided into two rows and slide connected with the lower X-axis front track and the lower X-axis rear track respectively. The lower X-axis front track and the lower X-axis rear track are fixed on the front and rear ends of the upper surface of the lower Y slide plate respectively. The lower X slide plate is fixedly connected with the lower X-axis motor. The lower X-axis motor is located between the lower X-axis front track and the lower X-axis rear track and is fixedly connected with the lower Y slide plate.

The bottom surface of the lower Y sliding plate is connected with four sliders. The four sliders are divided into two rows and sliding connected with the lower Y-axis left track and the lower Y-axis right track respectively. The lower Y-axis left track and the lower Y-axis right track are fixed on the marble base respectively. The lower Y slide plate is fixedly connected with the lower Y-axis motor mover. The lower Y-axis motor is located between the lower Y-axis left track and the lower Y-axis right track and is fixedly connected with the marble base.

The lower Y-axis left track and the lower Y-axis right track are parallel to the upper Y-axis left motor and the upper Y-axis right motor.

Preferably, the laser generator generates ultraviolet laser, and the energy of ultraviolet laser is greater than 500 mj/cm2, and the wavelength is greater than 308 nm.

Preferably, the window flat lens material is one of neodymium glass, silicate system glass, borate and borosilicate system glass and phosphate system glass;

The window mirror is a planar mirror with a back side single-sided silver plated, and the material is optical glass, which is installed on the laser optical path at an angle of 45 degrees.

The laser focusing lens material is one of the neodymium glass, silicate glass, borate and borosilicate glass and phosphate glass, the focusing window reflector focuses the laser beam reflected by the window reflector on the needle position to form a concentrated and tiny spot.

Preferably, the gas accessed to the inlet port of the pneumatic section is one of helium, neon, argon, krypton, xenon and nitrogen. Under the condition of laser irradiation, it has stable performance, and the working pressure is between 0.5 Mpa and 1.0 Mpa.

Preferably, the material of base plate fixture is one of Q235, 45#, Hr12, white steel, tungsten steel and stainless steel. The bottom surface of the base plate fixture has a bottom boss, and the bottom boss is corresponding to the suction cup groove on the upper surface of the vacuum base. There are several vertical through-holes in the bottom boss.

Therefore, the present invention adopts a pneumatic chip huge transfer mechanism for a laser ungluing needle. It uses a camera assembly to identify and record the position data of the pad and the chip, and uses the upper and lower mobile platform systems to drive the laser-assisted needle-punching assembly and the target substrate to the established station, respectively. It realizes three points and one line of needle nozzle-chip-pad, and the vertical power module drives the laser-assisted acupuncture component to move vertically, and the needle is lowered to the specified position to adjust the working gap between the needle, chip and pad. When the laser is opened in a small range, the properties of the blue film are greatly changed, the viscosity is reduced, the gas path is opened, and the bubbles with good shape are blown out at the laser irradiation position. The bubbles drive the chip to reach the specified pad, and the viscosity of the solder paste on the substrate pad is greater than that of the blue film after degumming, and the chip is peeled off to realize the transfer.

Compared with the existing technology, the advantage of the present invention is that: compared with the direct needle-punching method, this method avoids the defect that the direct needle-punching on the light-emitting side is easy to destroy the chip structure; compared with the spring acupuncture method, it avoids the loss of the chip during the top suction process and the defect that the Micro LED transfer condition is not applicable; compared with the first transfer to the transfer film and then the reverse film welding method, the defects of scratching the chip electrode and the increase of the influencing factors in the two-step transfer are avoided; compared with the tracking fixed-distance pneumatic transfer, the defects of the slow rebound of the bubble affecting the transfer efficiency are eliminated; compared with the pneumatic needle punching method, the defect of too strong viscosity of the blue film is avoided, the viscosity of the blue film is controlled, and the transfer yield is improved. The present invention realizes the flexible contact mass transfer without damage to the chip, controllable transfer attitude, good bubble shape, fast rebound, high efficiency and high yield, which is especially suitable for the mass transfer of Mini/Micro LED chips.

The following is a further detailed description of the technical scheme of the invention through the drawings and embodiments.

LABELS OF DRAWINGS 1. marble base; 2A. left marble pillar; 2B. right marble pillar; 3A. upper Y-axis left motor; 3B. upper Y-axis right motor; 4. beam; 5. upper X-axis motor; 6A. upper X-axis upper guide rail; 6B. upper X-axis lower guide rail; 7. transfer slide; 701. transfer slide transition plate; 702A. transfer slide A slider; 702B. transfer slide B slider; 702C. transfer slide C slider; 702D. transfer slide D slider; 8. vertical power module; 801. vertical power module stator; 802. vertical power module mover; 9. needle clamping bracket; 10. laser-assisted needle assembly; 1001. laser section; 1002. laser window; 1003. laser focusing objective lens; 1004. pneumatic section; 1005. inlet hole; 1006. micro-hole needle; 11. laser bracket; 12. laser generator; 13. camera assembly; 14. lower Y-axis motor; 1401. lower Y-axis motor stator; 1402. lower Y-axis motor mover; 15A. lower Y-axis right track; 15B. lower Y-axis left track; 16. lower Y-axis slide plate; 1601A. lower Y axis A slider; 1601B. lower Y axis B slider; 1601C. lower Y axis C slider; 1601D. lower Y axis D slider; 17. lower X-axis motor stator 1701. lower X-axis motor stator; 1702. lower X-axis motor stator; 18A. lower X-axis front track; 18B. lower X-axis rear track; 19. lower X-axis slide plate; 1901A. lower X-axis A slider; 1901B. lower X-axis B slider; 1901C. lower X-axis C slider; 1901D. lower X-axis D slider; 20. cylinder group; 2001.A cylinder; 2002.B cylinder; 2003.C cylinder; 2004.D cylinder; 21. vertical track of substrate; 22. vacuum base; 23. substrate fixture; 24. blue film assembly; 2401. blue film scaffold; 2402. blue film; 25. PCB board; 26. solder paste; 27. LED chip.

DETAILED DESCRIPTION OF THE EMBODIMENTS

The following is a further explanation of the technical scheme of the invention through drawings and implementation examples.

EXAMPLE

Figure 1:
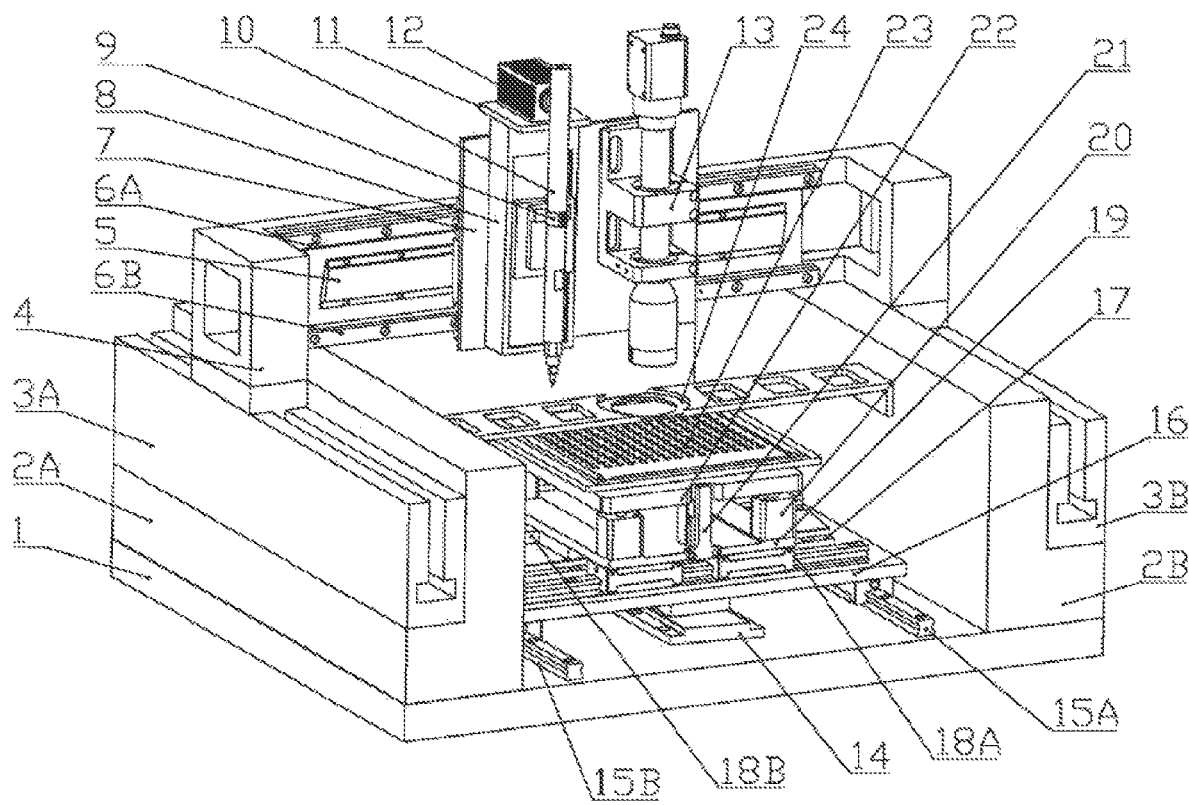
FIG. 1 is an overall structure diagram of the example of a pneumatic chip huge transfer mechanism for a laser ungluing needle of the present invention.

As shown in FIG. 1, a pneumatic chip huge transfer mechanism for a laser ungluing needle, wherein it includes an upper platform mobile system, a transfer platform system, a lower platform mobile system, the transfer platform system is set on the mobile system of the upper platform.

The upper platform mobile system includes a marble base 1, a left marble pillar 2A, a right marble pillar 2B, an upper Y-axis left motor 3A, an upper Y-axis right motor 3B and a beam 4. The left marble pillar 2A and the right marble pillar 2B are symmetrically arranged on both sides of the upper surface of the marble base 1, and fixed on the marble base 1 by fastening screws. The stator of the upper Y-axis left motor 3A is set on the left upper surface of the left marble pillar 2A, and the stator of the upper Y-axis right motor 3B is set on the right upper surface of the right marble pillar 2B, which are fixed connection by fastening screws. The left and right ends of the beam 4 are fixedly connected with the mover of the upper Y-axis left motor 3A and the mover of the upper Y-axis right motor 3B by fastening screws. Driven by the upper Y-axis left motor 3A and the upper Y-axis right motor 3B, the beam 4 moves linearly along the Y-axis direction driven by the mover on both sides.

The middle of the front surface of the beam 4 is equipped with an upper X-axis motor 5. The upper and lower parts of the upper X-axis motor 5 are respectively equipped with the upper X-axis upper guide rail 6A and the upper X-axis lower guide rail 6B. The upper X-axis upper guide rail 6A and the upper X-axis lower guide rail 6B are fixedly connected with the front surface of beam 4 by fastening screws.

Figure 2:
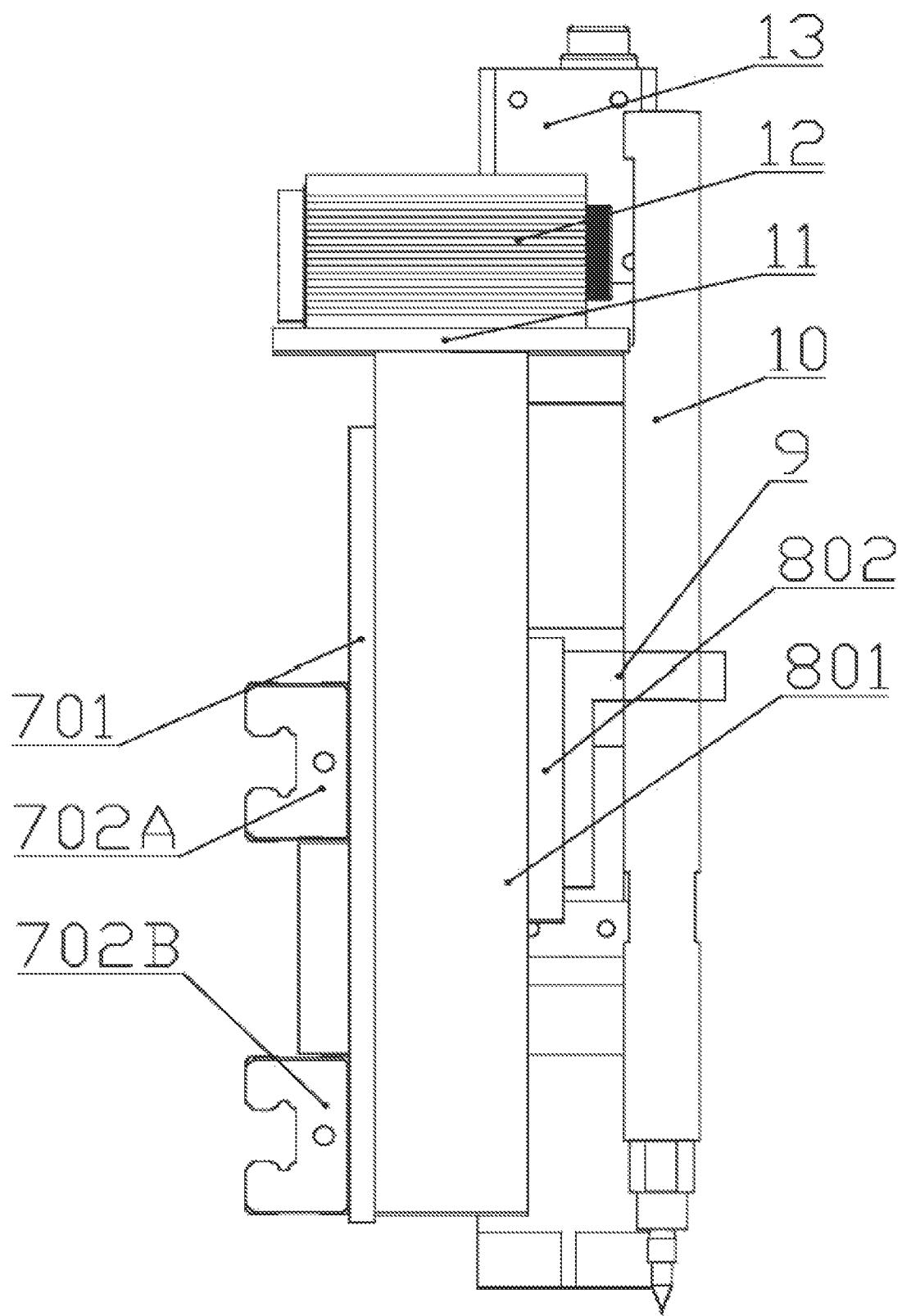
FIG. 2 is a schematic diagram of the left surface structure of the transfer platform system of the example of the present invention.
Figure 3:
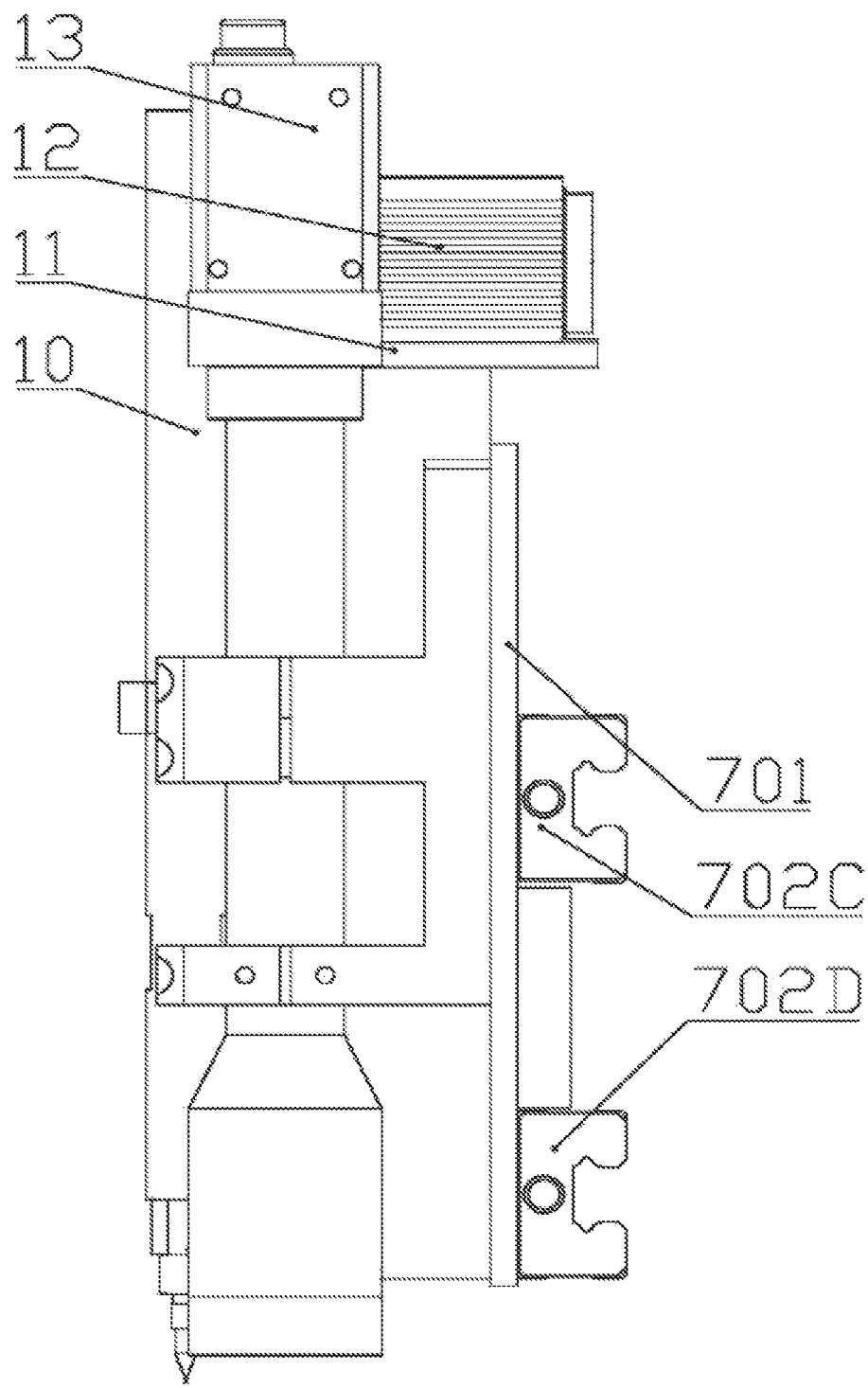
FIG. 3 is a schematic diagram of the right side surface structure of the transfer platform system of the example of the present invention.

As shown in FIG. 2 and FIG. 3, the transfer platform system includes a transfer slide 7, a vertical power module 8, a needle clamping bracket 9, a laser-assisted needle assembly 10, a camera assembly 13, a laser bracket 11 and a laser generator 12. The transfer slide 7 includes a transfer slide transition plate 701 and a transfer slide A slider 702A, a transfer slide B slider 702B, a transfer slide C slider 702C and a transfer slide D slider 702D, the transfer slide A slider 702A, the transfer slide B slider 702B, the transfer slide C slider 702C and the transfer slide D slider 702D are divided into two rows on the back of the transfer slide transition plate 701, and they are fixed by fastening screws. Wherein the transfer slide A slider 702A and the transfer slide C slider 702C are slidingly connected to an upper X-axis upper guide rail 6A.

The transfer slide B slider 702B and the transfer slide D slider 702D are slidingly connected to an upper X axis lower guide rail 6B, and a mover of the upper X-axis motor 5 is fixedly connected to the back of the transfer slide transition plate 701. When the upper X-axis motor 5 starts, the transfer slide transition plate 701 is driven by the upper X-axis motor 5 mover to move along the X-axis of beam 4. The transfer slide A slide 702A, the transfer slide B slide 702B, the transfer slide C slide 702C and the transfer slide D slide 702D have limiting and stabilizing effects, so that the transfer slide 7 remains stable during the movement.

Figure 4:
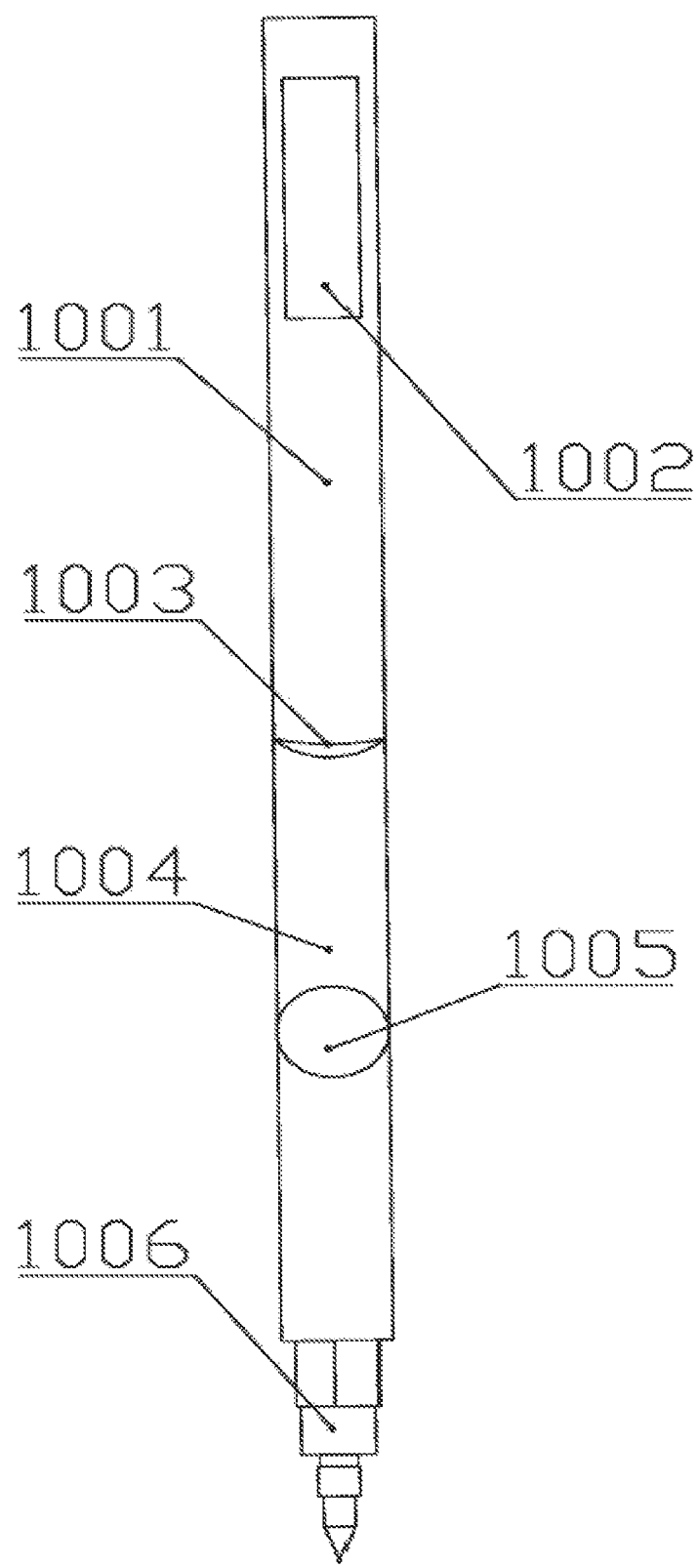
FIG. 4 is a schematic diagram of the front structure of the laser-assisted needle assembly of the example of the present invention.
Figure 5:
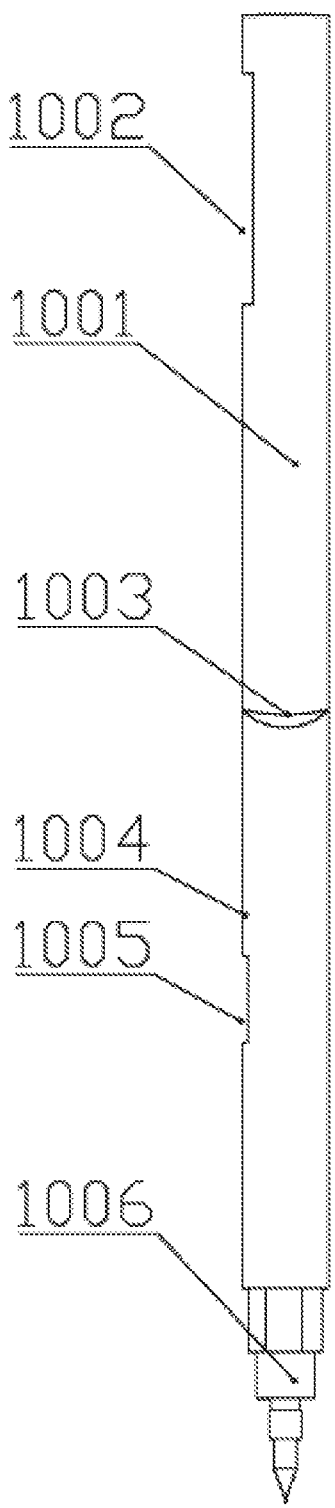
FIG. 5 is a schematic diagram of the side structure of the laser-assisted needle assembly for the example of the present invention.

The vertical power module 8 and the camera assembly 13 are fixed side by side on the transfer slide 7. The vertical power module 8 includes a vertical power module stator 801 and a vertical power module mover 802, and the vertical power module stator 801 is fixedly connected with the left front end surface of the transfer slide transition plate 701. The vertical power module mover 802 is slidingly connected with the vertical power module stator 801, and the needle clamping bracket 9 is fixed on the vertical power module mover 802. The laser-assisted needle assembly 10 is fixed on the needle clamping bracket 9, as shown in FIG. 4 and FIG. 5. The laser-assisted needle assembly 10 is a hollow cylinder, and the laser-assisted needle assembly 10 includes a laser section 1001, a pneumatic section 1004 and a micro-hole needle 1006. The laser section 1001 and the pneumatic section 1004 are separated by a laser focusing objective lens 1003. The pneumatic section 1004 and the laser section 1001 are fixed by self-screwing, and the micro-hole needle 1006 and the pneumatic section 1004 are also fixed by self-screwing. A circular inlet hole 1005 opened on the side of the pneumatic section 1004, and the needle tip of the micro-hole needle 1006 moves towards the downward platform. The gas connected to the inlet hole 1005 of the pneumatic section 1004 is one of helium, neon, argon, krypton, xenon and nitrogen. It has stable performance under laser irradiation conditions and does not react with the laser, and the working pressure is between 0.5 Mpa-1.0 Mpa.

Figure 6:
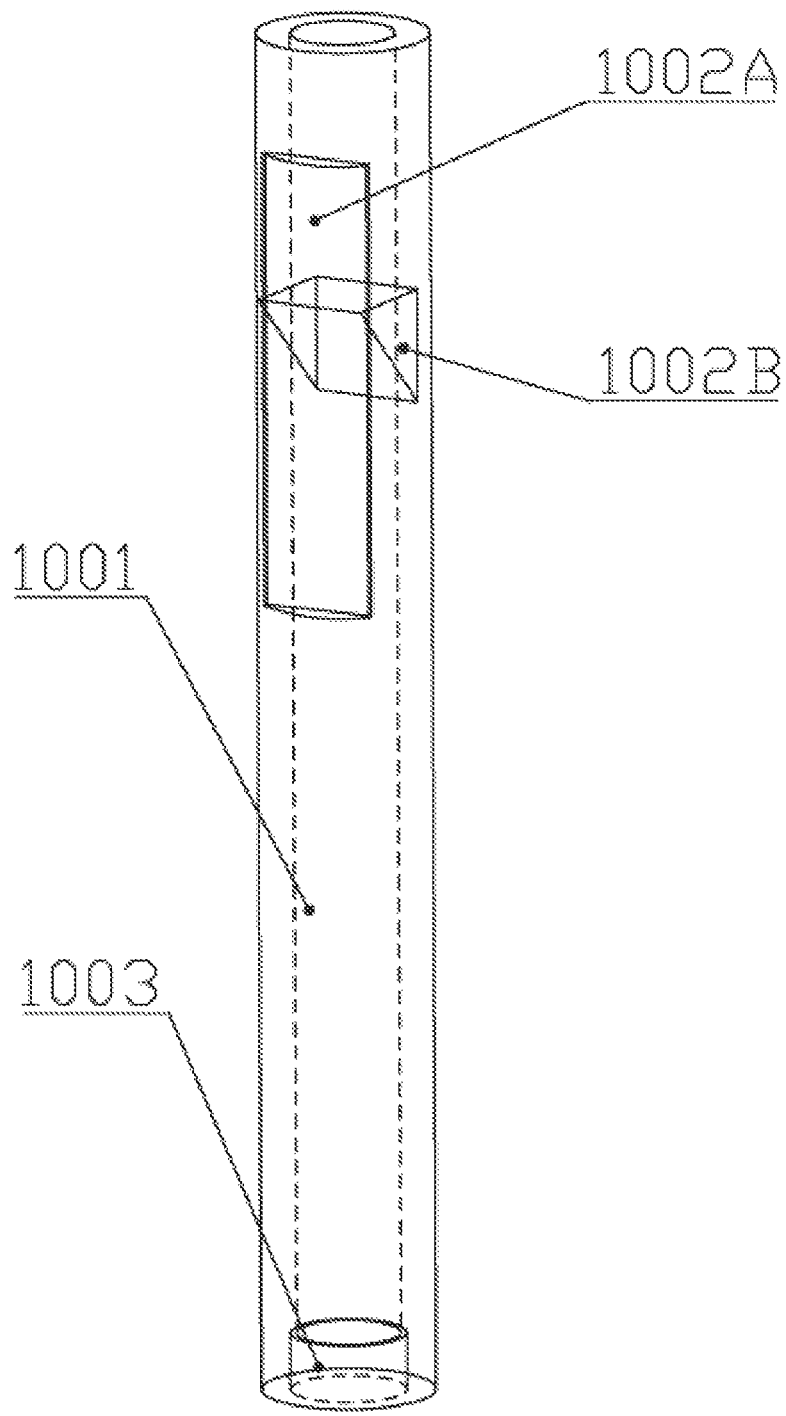
FIG. 6 is a schematic diagram of the internal structure of the laser-assisted needle assembly of the example of the present invention.

As shown in FIG. 6, the side top of the laser section 1001 opens to form a laser window 1002. The window flat lens is set at the laser window 1002, and the window reflector is set in the laser window 1002, and the window reflector is placed at 45°. The window flat lens material is one of the neodymium glass, silicate system glass, borate and borosilicate system glass and phosphate system glass. It has good transparency and thermo-optical stability, and the content of impurities absorbed near the laser wavelength is less. The window reflector is a planar reflector with a single silver-plated back side, the material of which is optical glass and is installed on the laser optical path at a 45-degree angle. The material of laser focusing objective lens 1003 is one of neodymium glass, silicate glass, borate and borosilicate glass and phosphate glass, and the focused window reflector focuses the laser beam reflected by the window reflector to the needle position to form a concentrated and small light.

The laser bracket 11 is set at the top of the vertical power module 8, and is fixed above the laser bracket 11. The laser emission port of laser generator 12 is facing the laser window 1002. The laser emitted by the laser generator 12 passes through the flat lens of the window and is reflected by the window reflector, which passes through the laser focusing lens 1003, the pneumatic section 1004 and the micro-hole needle 1006 in turn, and passes through the bottom of the micro-hole needle 1006. The laser generator 12 produces ultraviolet laser, and the energy of ultraviolet laser is more than 500 mj/cm2 and the wavelength is more than 308 nm.

Figure 7:
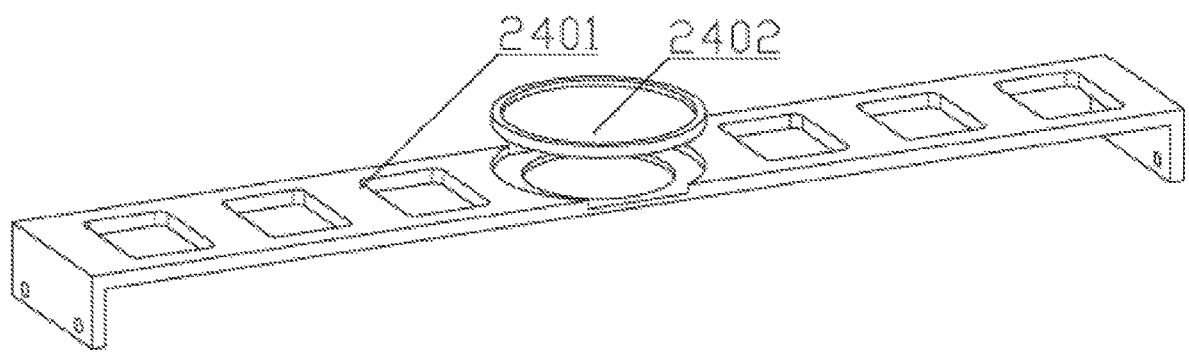
FIG. 7 is a schematic diagram of the blue film assembly of the example of the present invention.

The top of the lower platform mobile system is provided with a fixed blue film assembly 24 and a three-degree-of-freedom moving substrate fixture 23. As shown in FIG. 7, the blue film assembly 24 includes a blue film scaffold 2401 and a blue film 2402. The ends of the blue film scaffold 2401 are fixedly connected to the inner side of the left marble pillar 2A and the inner side of the right marble pillar 2B, respectively. The material of the blue film scaffold 2401 is one of stainless steel, aluminum and alloy materials, and the surface flatness is within 15 microns, and the surface is anodized. The blue film 2402 is stuck in the card slot in the middle of the blue film scaffold 2401 through a slot. The back of the blue film 2402 array bonding is equipped with a number of Mini/Micro LED chip 27, blue film 2402 using PET film substrate, which has excellent recovery deformation ability, blue film 2402 surface coating UV coating. The Mini/Micro LED chip 27 is bonded to the blue film 2402, and the UV coating on the surface of the blue film 2402 is deformed instantaneously by ultraviolet laser irradiation.

The viscosity of the blue film 2402 and the LED chip 27 before laser irradiation is 1000 mN/20 mm, and the viscosity after laser irradiation is 100 mN/20 mm.

Figure 8:
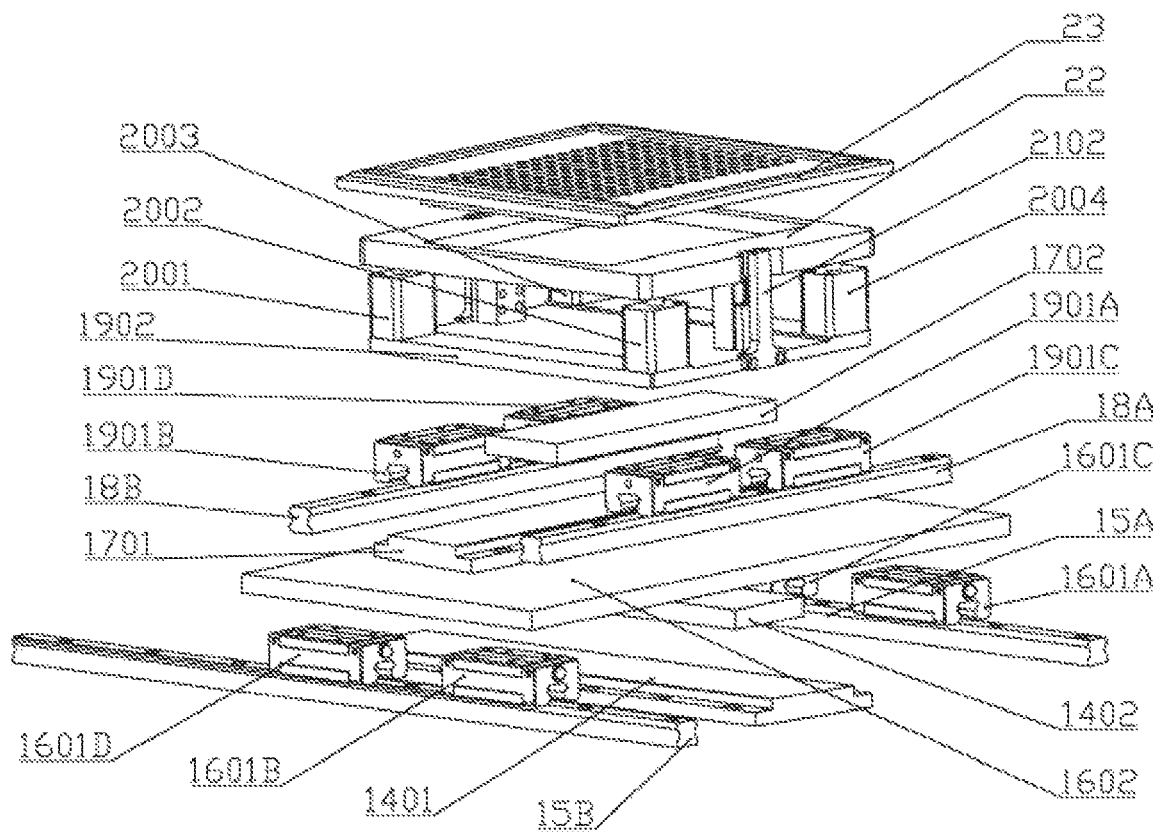
FIG. 8 is the structure diagram of the lower platform mobile system of the example of the present invention.

As shown in FIG. 8, the lower platform mobile system also includes a vacuum base 22, a vertical track of substrate 21, a cylinder group 20, a lower X-axis motor 17, a lower X-axis slide plate 19, a lower X-axis front track 18A, a lower Y-axis rear track, a lower Y-axis slide plate 16, a lower Y-axis motor 14, a lower Y-axis left track 15B and a lower Y-axis right track 15A. Wherein the substrate fixture 23 is fixed on the vacuum base 22. The vacuum base 22 is a metal groove with a vertical hole at the bottom. The groove may be matched with the bottom boss of the bottom surface of the substrate fixture 23 to form a closed space, and then the vertical through hole plus negative pressure can absorb the fixed substrate fixture 23. The overall surface flatness of the substrate fixture 23 is within 15 microns, and the material of the substrate fixture 23 is one of Q235, 45#, Hr12, white steel, tungsten steel and stainless steel.

The middle of the front and rear ends of the vacuum base 22 is slidingly connected with the two vertical tracks of substrate 21 respectively, and the two vertical tracks of substrate 21 are fixed in the middle of the front and rear ends of the lower X-axis slide plate 19 respectively. The cylinder group 20 consists of four cylinders. The four cylinders are A cylinder 2001, B cylinder 2002, C cylinder 2003 and D cylinder 2004. The four cylinders are respectively set on the four corners of the upper surface of the lower X-axis slide plate 19, and the piston rods of the four cylinders are connected with the four corners of the bottom surface of the vacuum base 22. When the cylinder group 20 starts, the vacuum base 22 is pushed up and down along the vertical track of substrate 21, giving the vacuum base 22 Z axial freedom.

The bottom surface of lower X-axis slide plate 19 is connected with four sliders, which are the lower X-axis A slider 1901 A, the lower X-axis B slider 1901 B, the lower X-axis C slider 1901 C, and the lower X-axis D slider 1901 D, respectively. The lower X-axis A slider 1901A and the lower X-axis C slider 1901C are slidingly connected to the lower X-axis front track 18A, and the lower X-axis B slider 1901 B and the lower X-axis D slider 1901 D are slidingly connected with the lower X-axis rear track 18 B. The lower X-axis front track 18 A and the lower X-axis rear track 18 B are fixed on the front and rear ends of the upper surface of the lower Y slide plate 16, respectively. The lower X-axis motor stator 1701 is located between the lower X-axis front track 18A and the lower X-axis rear track 18B and is fixedly connected to the lower Y-axis sliding plate 16. When the X-axis motor 17 starts, the lower X slide plate 19 moves along the X axis driven by the lower X-axis motor 1702, giving the vacuum base 22 X axial freedom. The connection between the slider and the track has the effect of stability and limit.

The bottom surface of the lower Y slide plate 16 is connected with four sliders. The four sliders include the lower Y axis A slider 1601 A, the lower Y axis B slider 1601 B, the lower Y axis C slider 1601 C, and the lower Y axis D slider 1601 D. The lower Y-axis B slider 1601B and the lower Y-axis D slider 1601D are slidingly connected to the lower Y-axis left track 15B, and the lower Y-axis A slider 1601A and the lower Y-axis C slider 1601C are slidingly connected to the lower Y-axis right track 15A. The lower Y-axis left track 15B and the lower Y-axis right track 15A are fixed on the marble base 1 respectively. The lower Y-slider 16 is fixedly connected to the lower Y-axis motor mover 1402. The lower Y-axis motor stator 1401 is located between the lower Y-axis left track 15B and the lower Y-axis right track 15A and is fixedly connected to the marble base 1. The lower Y-axis left track 15B and the lower Y-axis right track 15A are parallel to the upper Y-axis left motor 3A and the upper Y-axis right motor 3B. When the Y-axis motor 14 starts, the lower Y slide plate 16 moves along the Y-axis driven by the lower Y-axis motor 1402, giving the vacuum base 22 Y axial freedom.

Figure 9:
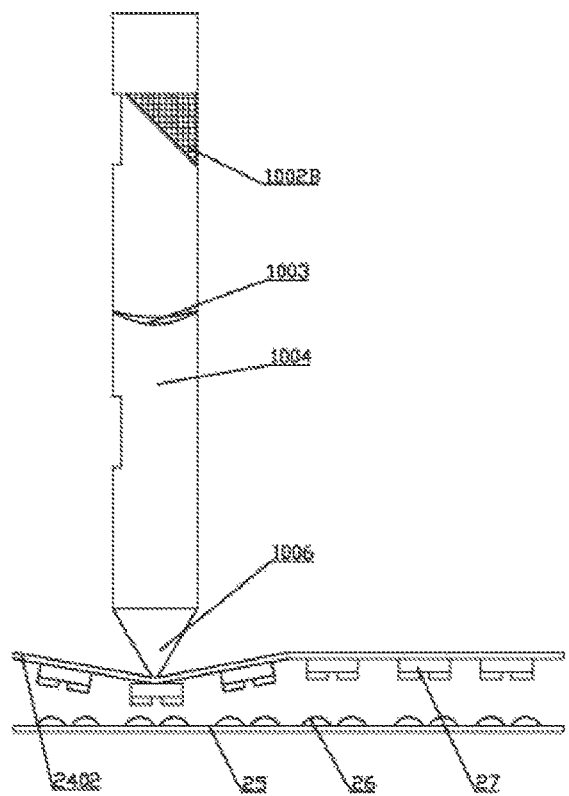
FIG. 9 is a schematic diagram of the first stage of the working process of the example of the present invention.

The present invention proposes a laser ungluing needle pneumatic chip huge transfer mechanism, and its working process is as follows:

The first stage: the upper and lower two groups of platform moving systems are used to drive the laser-assisted needle assembly 10 and the target substrate to the established station, respectively. To realize the needle nozzle-chip-PCB board 25 three points and one line, the vertical power module 8 drives the laser-assisted needle assembly 10 to move vertically. The needle is lowered to the specified position, and the working gap between the needle, LED chip 27 and PCB board 25 is adjusted, as shown in FIG. 9.

Figure 10:
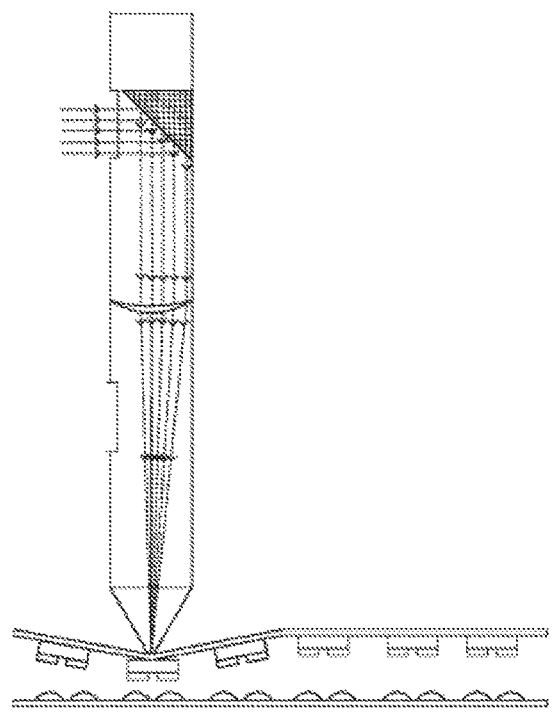
FIG. 10 is a schematic diagram of the second stage of the working process of the example of the present invention.

The second stage: start the laser generator 12, ultraviolet laser through the projection of the window flat lens, the reflection of the window reflector and the focusing of the laser focusing objective lens 1003 to form a spot, and open the laser on the blue film 2402. A small range of debinding, as shown in FIG. 10, the properties of the blue film 2402 have changed significantly, and the viscosity of the blue film 2402 and the LED chip 27 has decreased.

Figure 11:
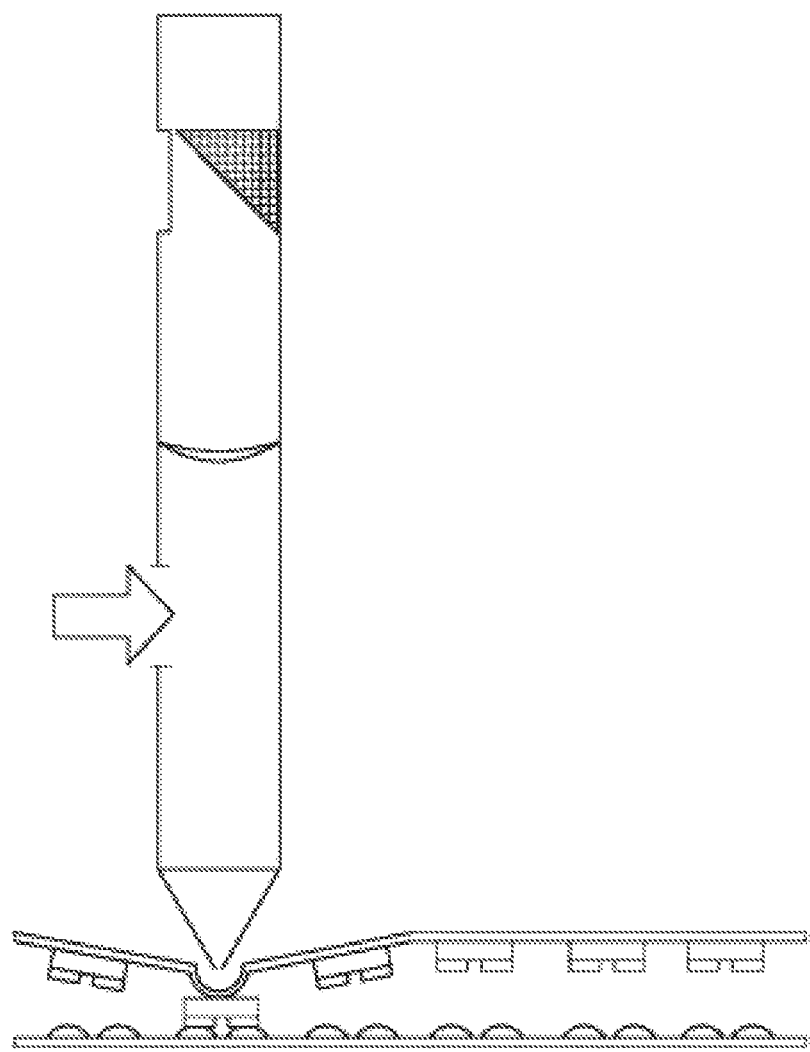
FIG. 11 is a schematic diagram of the third stage of the working process of the example of the present invention.

The third stage: open the gas path, the gas enters the pneumatic section 1004 through the inlet hole 1005, and blows out the well-shaped bubbles at the laser irradiation position through the micro-hole needle 1006. As shown in FIG. 11, the bubble drives the LED chip 27 to reach the specified PCB board 25, and the viscosity of the solder paste 26 on the PCB board 25 is greater than that of the blue film 2402 after debinding, and the LED chip 27 peels off to achieve transfer.

Finally, it should be explained that the above embodiments are only used to explain the technical scheme of the invention rather than restrict it. Although the invention is described in detail with reference to the better embodiment, the ordinary technical personnel in this field should understand that they can still modify or replace the technical scheme of the invention, and these modifications or equivalent substitutions cannot make the modified technical scheme out of the spirit and scope of the technical scheme of the invention.

What is claimed is:

1. A pneumatic chip huge transfer mechanism for a laser ungluing needle, comprising an upper platform mobile system, a transfer platform system, a lower platform mobile system, the transfer platform system is set on the mobile system of the upper platform, the transfer platform system comprises a transfer slide, a vertical power module, a needle clamping bracket, a laser-assisted needle assembly, a camera assembly, a laser bracket and a laser generator, the vertical power module and the camera assembly are fixed side by side on the transfer slide, the needle clamping bracket is set on the front surface of the vertical power module, and the laser bracket is arranged on the top of the vertical power module, and the laser generator is fixed on the laser bracket, the laser generator faces the laser-assisted needle assembly, and the laser-assisted needle assembly is a hollow cylindrical shape, the laser-assisted needle assembly comprises a laser section, a pneumatic section and a micro-hole needle, the laser section and the pneumatic section are separated by a laser focusing objective lens, the side top of the laser section opens to form a laser window, which is equipped with a window flat lens, and a window reflector is set in the laser window, and the window reflector is placed at 45°, after the laser emitted by the laser generator passes through the window flat lens, it is reflected by the window reflector and passes through the laser focusing objective lens, the pneumatic section and the micro-hole needle in turn, a circular inlet hole is set on the side of the pneumatic section, and the tip of the microporous needle moves towards the lower platform moving system, the top of the lower platform moving system is provided with a fixed blue film assembly and a three-degree-of-freedom moving substrate fixture, the blue film assembly comprises a blue film scaffold and a blue film, and the back of the blue film array is bonded with Mini/Micro LED chips.

2. The pneumatic chip huge transfer mechanism for the laser ungluing needle according to claim 1, wherein the upper platform mobile system comprises a marble base, a left marble pillar, a right marble pillar, an upper Y-axis left motor, an upper Y-axis right motor and a beam, the left marble pillar and the right marble pillar are symmetrically arranged on both sides of the upper surface of the marble base, a stator of the Y-axis left motor is set on the left upper surface of the left marble pillar, and a stator of the Y-axis night motor is set on the right upper surface of the right marble pillar, a left end and a right of the beam are fixedly connected with the mover of the upper Y-axis left motor and the mover of the upper Y-axis right motor respectively, an upper X-axis motor is arranged in the middle of the front end of the beam, an upper X-axis upper guide rail and an upper X-axis lower guide rail are respectively arranged above and below the upper X-axis motor, and an upper X-axis guide rail and a lower X-axis guide rail are fixedly connected to the front surface of the beam.

3. The pneumatic chip huge transfer mechanism for the laser ungluing needle according to claim 2, wherein the lower platform mobile system also comprises a vacuum base, a vertical track of substrate, a cylinder group, a lower X-axis motor, a lower X-axis slide plate, a lower X-axis front track, a lower Y-axis rear track, a lower Y-axis slide plate, a lower Y-axis motor, a lower Y-axis left track and a lower Y-axis right track, wherein the substrate fixture is fixed on the vacuum base, the middle of the front and back ends of the vacuum base are respectively sliding connected with the vertical orbits of the two substrates, the two vertical rails of the substrate are fixed in the middle of the front and rear ends of the lower X slide plate respectively, the cylinder group consists of four cylinders, which are respectively arranged on the upper surface of the lower X slide plate, and the piston rod of the four cylinders is connected with the bottom four corners of the vacuum base; the bottom surface of the lower X slide plate is connected with four sliders, the four sliders are divided into two rows and sliding connected with the front track of the lower X axis and the rear track of the lower X axis respectively, the front track of the lower X-axis and the rear track of the lower X-axis are fixed at the front and rear ends of the upper surface of the lower Y sliding table, respectively, the lower X-axis motor is located between the front track of the lower X-axis and the rear track of the lower X-axis and is fixedly connected with the lower Y-axis slide plate;

the bottom surface of the lower X slide plate is connected with four sliders, and the four sliders are divided into two rows and slide connected with the lower X-axis front track and the lower X-axis rear track respectively, the lower X-axis front track and the lower X-axis rear track are fixed on the front and rear ends of the upper surface of the lower Y slide plate respectively, and the lower X slide plate is fixedly connected with the lower X-axis motor, and the lower X-axis motor is located between the lower X-axis front track and the lower X-axis rear track and is fixedly connected with the lower Y slide plate; and the bottom surface of the lower Y sliding plate is connected with four sliders, the four sliders are divided into two rows and sliding connected with the lower Y-axis left track and the lower Y-axis right track respectively, the lower Y-axis left track and the lower Y-axis right track are fixed on the marble base respectively, and the lower Y slide plate is fixedly connected with the lower Y-axis motor mover, the lower Y-axis motor is located between the lower Y-axis left track and the lower Y-axis right track and is fixedly connected with the marble base, and the lower Y-axis left track and the lower Y-axis right track are parallel to the upper Y-axis left motor and the upper Y-axis right motor.

4. The pneumatic chip huge transfer mechanism for the laser ungluing needle according to claim 3, wherein the material of base plate fixture is one of white steel, tungsten steel and stainless steel, the bottom surface of the base plate fixture has a bottom boss, and the bottom boss is corresponding to the suction cup groove on the upper surface of the vacuum base, and there are several vertical through-holes in the bottom boss.

5. The pneumatic chip huge transfer mechanism for the laser ungluing needle according to claim 1, wherein the laser generator generates the ultraviolet laser, the energy of ultraviolet laser is greater than 500 mj/cm$^2$, and the wavelength is greater than 308 nm.

6. The pneumatic chip huge transfer mechanism for the laser ungluing needle according to claim 1, wherein the transfer slide comprises a transfer slide transition plate and a transfer slide A slider, a transfer slide B slider, a transfer slide C slider, a transfer slide D slider, the transfer slide A slider, the transfer slide B slider, the transfer slide C slider and the transfer slide D slider are divided into two rows on the back of the transfer slide transition plate, wherein the transfer slide A slider and the transfer slide C slider are slidingly connected to an upper X-axis upper guide rail, the transfer slide B slider and the transfer slide D slider are slidingly connected to an upper X axis lower guide rail, a mover of the upper X-axis motor is fixedly connected to the back of the transfer slide transition plate, the vertical power module comprises a vertical power module stator and a vertical power module mover, a stator of the vertical power module is fixedly connected to a left front surface of the transfer slide transition plate, a mover of the vertical power module is sliding connected with the stator of the vertical power module, and the needle clamping bracket is fixed on the mover of the vertical power module.

7. The pneumatic chip huge transfer mechanism for the laser ungluing needle according to claim 1, wherein the two ends of the blue film scaffold are fixedly connected with the inner side of the left marble pillar and the inner side of the right marble pillar respectively, the material of the blue film scaffold is one of stainless steel, aluminum alloy materials, the surface flatness is within 15 microns, and the surface is anodized; and the blue film is arranged in the groove in the middle of the blue film scaffold, which is based on PET film substrate, and the surface of the blue film is coated with UV coating.

8. The pneumatic chip huge transfer mechanism for the laser ungluing needle according to claim 1, wherein the window flat lens material is one of neodymium glass, silicate system glass, borate and borosilicate system glass and phosphate system glass;

the window mirror is a planar mirror with a back side single-sided silver plated, and the material is optical glass, and it is installed on the laser optical path at an angle of 45 degrees; and the laser focusing lens material is one of the neodymium glass, silicate glass, borate and borosilicate glass and phosphate glass, the focusing window reflector focuses the laser beam reflected by the window reflector on the needle position to form a concentrated and tiny spot.

9. The pneumatic chip huge transfer mechanism for the laser ungluing needle according to claim 1, wherein the gas accessed to the inlet port of the pneumatic section is one of helium, neon, argon, krypton, xenon and nitrogen, under the condition of laser irradiation, it has stable performance, and the working pressure is between 0.5 Mpa and 1.0 Mpa.

10. A process for working of the laser ungluing needle pneumatic chip huge transfer mechanism according to claim 1, wherein the process comprises:

first stage: the upper and lower two groups of platform moving systems are used to drive the laser-assisted needle assembly and a target substrate to the established station, respectively, to realize the needle nozzle-chip-PCB board three points and one line; the vertical power module drives the laser-assisted needle assembly to move vertically, and the needle is lowered to the specified position, and the working gap between the needle, LED chip and PCB board is adjusted;

second stage: starting the laser generator, ultraviolet laser through the projection of the window flat lens, the reflection of the window reflector and the focusing of the laser focusing objective lens to form a spot, and opening the laser on the blue film, a small range of debinding, the properties of the blue film have changed significantly, and the viscosity of the blue film and the LED chip has decreased; and third stage: opening a gas path, the gas enters the pneumatic section through an inlet hole, and blows out the well-shaped bubbles at the laser irradiation position through the micro-hole needle, the bubble drives the LED chip to reach the specified PCB board, and the viscosity of the solder paste on the PCB board is greater than that of the blue film after debinding, and the LED chip peels off to achieve transfer.

* * * * *